(12) United States Patent
Hasegawa et al.

(10) Patent No.: US 11,773,246 B2
(45) Date of Patent: Oct. 3, 2023

(54) BINDER FOR NONAQUEOUS ELECTROLYTE SECONDARY BATTERY ELECTRODE

(71) Applicants: TOAGOSEI CO. LTD., Tokyo (JP); PANASONIC ENERGY CO., LTD., Moriguchi (JP)

(72) Inventors: Takashi Hasegawa, Nagoya (JP); Naohiko Saito, Nagoya (JP); Atsushi Nishiwaki, Nagoya (JP); Hideo Matsuzaki, Nagoya (JP); Sho Urata, Hyogo (JP); Nobuhiro Sakitani, Osaka (JP); Takaharu Morikawa, Osaka (JP)

(73) Assignees: TOAGOSEI CO. LTD., Tokyo (JP); PANASONIC ENERGY CO., LTD., Moriguchi (JP)

( * ) Notice: Subject to any disclaimer, the term of this patent is extended or adjusted under 35 U.S.C. 154(b) by 851 days.

(21) Appl. No.: 16/499,568

(22) PCT Filed: Mar. 5, 2018

(86) PCT No.: PCT/JP2018/008259
§ 371 (c)(1),
(2) Date: Sep. 30, 2019

(87) PCT Pub. No.: WO2018/180232
PCT Pub. Date: Oct. 4, 2018

(65) Prior Publication Data
US 2020/0263019 A1 Aug. 20, 2020

(30) Foreign Application Priority Data
Mar. 28, 2017 (JP) ................. 2017-063810

(51) Int. Cl.
*H01M 4/62* (2006.01)
*C08L 33/08* (2006.01)
*C08F 20/06* (2006.01)

(52) U.S. Cl.
CPC ............. *C08L 33/08* (2013.01); *C08F 20/06* (2013.01); *H01M 4/622* (2013.01)

(58) Field of Classification Search
CPC ...... C08L 33/08; C08L 2203/20; C08L 33/02; C08F 20/06; C08F 8/44; C08F 220/06; H01M 4/622; H01M 10/052; Y02E 60/10
See application file for complete search history.

(56) References Cited

U.S. PATENT DOCUMENTS

| | | | | |
|---|---|---|---|---|
| 2010/0069592 A1* | 3/2010 | Matzuaki | ............ | C08F 290/061 526/318.4 |
| 2011/0183212 A1 | 7/2011 | Takahashi et al. | | |
| 2013/0101897 A1 | 4/2013 | Fukui et al. | | |
| 2013/0119318 A1 | 5/2013 | Hanasaki et al. | | |
| 2014/0256872 A1* | 9/2014 | Fujiwara | ............... | C11D 3/3757 524/556 |
| 2015/0044559 A1 | 2/2015 | Toyoda | | |
| 2016/0126551 A1 | 5/2016 | Sasaki | | |
| 2017/0062828 A1 | 3/2017 | Sonobe et al. | | |
| 2017/0244095 A1* | 8/2017 | Sonobe | ................. | H01M 4/483 |
| 2017/0352886 A1* | 12/2017 | Matsuzaki | ........ | H01M 10/0525 |
| 2018/0151882 A1 | 5/2018 | Shimanuki et al. | | |
| 2019/0157677 A1 | 5/2019 | Toyoda | | |

FOREIGN PATENT DOCUMENTS

| | | |
|---|---|---|
| CN | 102934269 A | 2/2013 |
| JP | 2000-294247 A | 10/2000 |
| JP | 2011-154983 A | 8/2011 |
| JP | 2012-246392 A | 12/2012 |
| JP | 2013-093297 A | 5/2013 |
| JP | 2015-018776 A | 1/2015 |
| JP | 2015-149225 A | 8/2015 |
| JP | 2015-231924 A | 12/2015 |
| JP | 2017-037714 A | 2/2017 |
| JP | 2017-059400 A | 3/2017 |
| WO | 2013/146548 A1 | 10/2013 |
| WO | 2014/156195 A1 | 10/2014 |
| WO | 2014/196547 A1 | 12/2014 |
| WO | 2015/098050 A1 | 7/2015 |
| WO | 2015/133154 A1 | 9/2015 |
| WO | 2015/186363 A1 | 12/2015 |
| WO | 2016/158939 A1 | 10/2016 |

(Continued)

OTHER PUBLICATIONS

Apr. 6, 2021 Office Action issued in Japanese Patent Application No. 2019-509078.
Aoki et al.; "Acrylic Acid-Based Copolymers as Functional Binder for Silicone/Graphite Composite Electrode in Lithium-Ion Batteries"; The Electrochemical Society; 2015; vol. 162; pp. A2245-A2249.
Apr. 24, 2022 Office Action issued in Chinese Patent Application No. 201880022688.X.
Apr. 24, 2018 Written Opinion issued in International Patent Application No. PCT/JP2018/008259.

(Continued)

*Primary Examiner* — Christian Roldan
(74) *Attorney, Agent, or Firm* — Oliff PLC

(57) ABSTRACT

A binder for a non-aqueous electrolyte secondary battery electrode that includes a crosslinked polymer having a carboxyl group or a salt thereof, wherein the crosslinked polymer includes 50% by mass or more and 100% by mass or less structural unit derived from an ethylenically unsaturated carboxylic acid monomer relative to all structural units, wherein a total amount of the ethylenically unsaturated carboxylic acid monomer and a salt thereof in terms of a non-neutralized form which is converted from the ethylenically unsaturated carboxylic acid monomer and a salt thereof relative to a total amount of the crosslinked polymer and a salt thereof is 5.0% by mass or less.

9 Claims, No Drawings

(56) References Cited

FOREIGN PATENT DOCUMENTS

WO      2016/194733 A1      12/2016

OTHER PUBLICATIONS

Apr. 24, 2018 International Search Report issued in International Patent Application No. PCT/JP2018/008259.

Oct. 6, 2020 Office Action issued in Japanese Patent Application No. 2019-509078.

Sep. 21, 2022 Office Action issued in Chinese Patent Application No. 201880022688.X.

Apr. 26, 2022 Office Action issued in Japanese Patent Application No. 2022-700095.

Aug. 15, 2022 Office Action issued in Japanese Patent Application No. 2022-700280.

Yamagiwa et al., Organic Square; vol. 55; pp. 6-8;(https://labchemwako.fujifilm.com/jp/journal/docs/or g55.pdf); Mar. 2016.

Specifications of polyacrylic acid (product No. 306215) manufactured by Aldrich.

Safety data sheet of polyacrylic acid (product No. 306215) manufactured by Aldrich.

Safety data sheet of polyacrylic acid (product name: 1CLPAH, product code: 352-41132) manufactured by FUJIFILM Wako Pure Chemical Corporation.

Safety data sheet of polyacrylic acid (product name: 10CLPAH, product code: 359-41142) manufactured by FUJIFILM Wako Pure Chemical Corporation.

Safety data sheet of polyacrylic acid (product name: 20CLPAH, product code: 356-41152) manufactured by FUJIFILM Wako Pure Chemical Corporation.

Masahiro Hatano; Polymer; vol. 15; No. 6 (No. 171); pp. 457-466; 1966; Internet <URL:https://www.jstage.jst.go.jp/art icle/kobunshi1952/15/6/15_6_457/_p df>.

* cited by examiner

BINDER FOR NONAQUEOUS ELECTROLYTE SECONDARY BATTERY ELECTRODE

FIELD

The technique disclosed herein relates to a binder for a non-aqueous electrolyte secondary battery electrode that can be used for lithium-ion secondary batteries and the like and use thereof, and a method for producing a carboxyl group-containing crosslinked polymer or a salt thereof used for the binder.

CROSS REFERENCE TO RELATED APPLICATIONS

This application is a related application of Japanese Patent Applications 2017-063809 and 2017-063810 filed on Mar. 28, 2017, all contents of which are incorporated herein by reference. This application also claims priority based on Japanese Patent Application No. 2017-063809.

BACKGROUND ART

Non-aqueous electrolyte secondary batteries such as lithium-ion secondary batteries are required to have excellent durability (cycle property). During charging and discharging, active materials are swollen and shrink because of occlusion and release of lithium ions. Therefore, binders with high binding strength are required in order to avoid peeling and detachment of mixture layers. Non-aqueous electrolyte secondary battery electrodes are prepared by, for example, applying compositions for electrode mixture layer formations containing active materials, binders and the like on current collectors and drying the same. Binders used for negative electrode mixture layer compositions are water-based binders containing styrene-butadiene rubber (SBR) latex and carboxymethylcellulose (CMC). Binders containing acrylic acid polymer aqueous solution or aqueous dispersion are known binders having excellent dispersibility and binding ability. Meanwhile, a solution of polyvinylidene fluoride (PVDF) in N-methyl-2-pyrrolidone (NMP) has been widely used as a binder for positive electrode mixture layers. However, there are increasing needs for water-based positive electrode mixture layer compositions without using organic solvents based on recent increased environmental consciousness.

Meanwhile, as applications of lithium-ion secondary batteries expand, demands for improved reliability and durability thereof tend to increase. Therefore, studies have been made in order to improve binding ability of binders and thus to further improve durability of electrodes (Patent Literatures 1 to 3).

For example, Patent Literature 1 discloses a binding agent for formation of a negative electrode coating film of a lithium-ion secondary battery, which is an acrylic acid polymer crosslinked by a polyalkenyl ether. Patent Literature 2 discloses a water-based electrode binder for a secondary battery, comprising a water-soluble polymer that has a specific aqueous solution viscosity and comprises a structural unit derived from an ethylenically unsaturated carboxylic acid salt monomer and a structural unit derived from an ethylenically unsaturated carboxylic acid ester monomer. Patent Literature 3 discloses a water-based binder for a secondary battery having a specific aqueous solution viscosity and comprising a specific amount of a structural unit derived from an ethylenically unsaturated carboxylic acid monomer relative to an active material.

CITATION LIST

Patent Literature

[Patent Literature 1] Japanese Patent Application Publication No. 2000-294247
[Patent Literature 2] Japanese Patent Application Publication No. 2015-18776
[Patent Literature 3] WO 2016/158939

Patent Literature 1 discloses use of a crosslinked polyacrylic acid as a binding agent. However, an improvement in durability of the electrode obtained was still required. The binder disclosed in Patent Literature 2 had preferable flexibility, while the binding ability thereof was not satisfactory. There is also a room for further improvement in binding ability of the binder disclosed in document 3.

With the foregoing in view, the technique disclosed herein provides a water-based binder for a non-aqueous electrolyte secondary battery having excellent binding ability.

SUMMARY

Solution to Problem

As a result of an exhaustive study carried out by the inventors of the present invention, the inventors found that an electrode mixture layer obtained using a binder for a non-aqueous electrolyte secondary battery electrode containing a crosslinked polymer or a salt thereof (hereinafter also referred to as crosslinked polymer (salt)) containing a regulated amount of acrylic acid remaining as a monomer in the crosslinked polymer (salt) shows excellent binding ability. According to the present specification, means indicated below are provided on the basis of the finding.

The disclosure herein provides a binder for a non-aqueous electrolyte secondary battery electrode containing a crosslinked polymer having a carboxyl group or a salt thereof. The binder for a non-aqueous electrolyte secondary battery may contain a crosslinked polymer or a salt thereof containing 50% by mass or more and 100% by mass or less of structural units derived from an ethylenically unsaturated carboxylic acid monomer relative to all structural units, wherein the total amount of the ethylenically unsaturated carboxylic acid monomer and a salt thereof in terms of a non-neutralized form which is converted from the ethylenically unsaturated carboxylic acid monomer and a salt thereof relative to the total amount of the crosslinked polymer and a salt thereof is 5.0% by mass or less.

DESCRIPTION OF EMBODIMENTS

The binder for a non-aqueous electrolyte secondary battery electrode disclosed herein may exhibit excellent binding ability to a current collector and an active material, and thus an electrode mixture layer having excellent integrity may be formed. Because of this, detachment of mixture layers hardly occurs even after charging and discharging at a high rate, and a secondary battery with high durability (cycle property) may be obtained.

The composition for a non-aqueous electrolyte secondary battery electrode mixture layer disclosed herein has preferable binding ability to an active material, and thus an electrode mixture layer having preferable integrity may be formed and a non-aqueous electrolyte secondary battery electrode with preferable electrode properties may be obtained.

The binder for a non-aqueous electrolyte secondary battery disclosed herein contains a crosslinked polymer or a salt thereof, and may provide an electrode mixture layer composition by mixing the binder with an active material and water. The composition may be in the form of slurry that may be applied on a current collector, or may be prepared in the form of wet powder that may be used for pressing onto the surface of a current collector. By forming a mixture layer formed from the composition on the surface of a current collector such as a copper foil or an aluminum foil, the non-aqueous electrolyte secondary battery electrode may be obtained.

The binder for a non-aqueous electrolyte secondary battery disclosed herein may be, for example, in the embodiment indicated below without particular limitation. Namely, the crosslinked polymer or a salt thereof may further have a structural unit derived from a crosslinkable monomer. The salt of the crosslinked polymer may contain a lithium salt. A 0.5% by mass aqueous solution of the crosslinked polymer or a salt thereof may show a pH of 7.5 or more.

The following provides a detailed explanation of representative, non-limiting specific examples of the present disclosure with suitable reference to the drawings. This detailed explanation is merely intended to indicate details for carrying out preferable examples of the present disclosure to a person with ordinary skill in the art, and is not intended to limit the scope of the present disclosure. In addition, additional characteristics and inventions disclosed below can be used separately or in combination with other characteristics and inventions in order to further improve binder for nonaqueous electrolyte secondary battery electrode.

In addition, combinations of the characteristics and steps disclosed in the following detailed explanation are not essential for carrying out the present disclosure in the broad sense, and are only described to explain representative detailed examples of the present disclosure in particular. Moreover, the various characteristics of the above-mentioned and forthcoming representative specific examples along with the various characteristics disclosed in independent and dependent claims are not required to be combined as described in the specific examples described herein or in the order in which they are listed in the providing of additional and useful embodiments of the present disclosure.

All characteristics described in the present description and/or claims are intended to be disclosed separately and mutually independently from the constitution of the characteristics described in the examples and/or claims while limiting to the disclosure and claimed specified matters at the time of initial filing. Moreover, all descriptions relating to numerical ranges and groups or populations are intended to disclose intermediate constitutions thereof while limiting to the disclosure and claimed specified matters at the time of initial filing.

The binder for a non-aqueous electrolyte secondary battery disclosed herein and various modes in which the binder is used are described hereinafter. The "(meth)acryl" as used herein means acryl and/or methacryl, and the "(meth)acrylate" means acrylate and/or methacrylate. The "(meth)acryloyl group" means an acryloyl group and/or methacryloyl group.

(Binder)

The binder (hereinafter also referred to as the present binder) disclosed herein contains a crosslinked polymer (hereinafter also referred to as the present crosslinked polymer) having a carboxyl group or a salt thereof. The present crosslinked polymer has a structural unit derived from an ethylenically unsaturated carboxylic acid monomer.

(Structural Unit Derived from an Ethylenically Unsaturated Carboxylic Acid Monomer)

The present crosslinked polymer may have a structural unit (hereinafter also referred to as "component (a)") derived from an ethylenically unsaturated carboxylic acid monomer. The bonding ability to a current collector increases and excellent desolvation effect and ion conductivity of lithium ions may be obtained when the crosslinked polymer has a carboxyl group, resulting in an electrode having low resistance and excellent charge and discharge properties (high-rate performance) at high current density. Because water swelling property is imparted, the dispersion stability of an active material and the like in a mixture layer composition may be increased.

The component (a) may be introduced by, for example, polymerizing monomers containing an ethylenically unsaturated carboxylic acid monomer. Alternatively, the component (a) may be obtained by (co)polymerizing a (meth)acrylic acid ester monomer followed by hydrolysis. Alternatively, (meth)acrylamide, (meth)acrylonitrile and the like may be polymerized followed by treatment with a strong alkali or a method in which a polymer having a hydroxy group is reacted with an acid anhydride may also be used.

Examples of the ethylenically unsaturated carboxylic acid monomer include (meth)acrylic acid; (meth)acrylamidoalkylcarboxylic acids such as (meth)acrylamidohexanoic acid and (meth)acrylamidododecanoic acid; ethylenically unsaturated monomers having carboxyl groups such as succinic acid monohydroxyethyl (meth)acrylate, ω-carboxy-caprolactone mono(meth)acrylate and β-carboxyethyl (meth)acrylate and (partially) alkali-neutralized products thereof. These monomers may be used alone or two or more thereof may be used in combination. Among others, the compound having an acryloyl group is preferable because of high polymerization rate and thus provision of a polymer having a long primary chain, resulting in preferable binding strength of the binder, and acrylic acid is particularly preferable. When the ethylenically unsaturated carboxylic acid monomer used is acrylic acid, a polymer having high carboxyl group content may be obtained.

The content of the component (a) in the present crosslinked polymer is not particularly limited and may be, for example, 50% by mass or more and 100% by mass or less relative to all structural units in the crosslinked polymer. Because the content of the component (a) is within the above range, excellent bonding ability to a current collector may be easily secured. The lower limit is, for example, 60% by mass or more, or for example 70% by mass or more, or for example 80% by mass or more. When the present crosslinked polymer contains the structural unit derived from the crosslinkable monomer described hereinbelow, the upper limit of the component (a) may be 99.95% by mass or less or 99.0% by mass or less. When the proportion of the ethylenically unsaturated carboxylic acid monomer relative to all structural units is less than 50% by mass, dispersion stability, binding ability and durability of a battery may be insufficient.

(Other Structural Units)

The present crosslinked polymer may contain, in addition to the component (a), a structural unit (hereinafter also referred to as "component (b)") derived from an additional ethylenically unsaturated monomer capable of copolymerizing with the ethylenically unsaturated carboxylic acid monomer. Examples of the component (b) include a structural unit derived from an ethylenically unsaturated monomer compound having an anionic group other than carboxyl group such as a sulfonate group and a phosphate group or a nonionic ethylenically unsaturated monomer. The structural unit may be introduced by copolymerizing monomers containing an ethylenically unsaturated monomer compound having an anionic group other than carboxyl group such as a sulfonate group and a phosphate group or a nonionic ethylenically unsaturated monomer. Among others, the component (b) is preferably a structural unit derived from a nonionic ethylenically unsaturated monomer because of flexing endurance.

The nonionic ethylenically unsaturated monomer is preferably (meth)acrylamide or a derivative thereof because of excellent binding ability of the binder. Examples of the (meth)acrylamide derivative include N-alkyl(meth)acrylamide compounds such as isopropyl(meth)acrylamide, t-butyl (meth)acrylamide, N-n-butoxymethyl(meth)acrylamide and N-isobutoxymethyl(meth)acrylamide; and N,N-dialkyl (meth)acrylamide compounds such as dimethyl(meth)acrylamide and diethyl(meth)acrylamide. The compounds may be used alone or two or more thereof may be used in combination.

When the component (b) is a structural unit derived from a nonionic ethylenically unsaturated monomer, the proportion thereof is not particularly limited and may be, for example, 1% by mass or more and 50% by mass or less relative to all structural units in the present crosslinked polymer. When the present crosslinked polymer includes 1% by mass of more component (b), the mixture layer obtained has higher flexibility, and thus an electrode having excellent flexing endurance may be easily obtained. Because affinity for an electrolyte solution improves, an effect for improving lithium ion conductivity may also be expected. The proportion of the component (b) is, for example, 5% by mass or more and 40% by mass or less, or for example 10% by mass or more and 30% by mass or less. The upper limit of the component (b) may be 49.95% by mass or less or may be 49.9% by mass or less. When the proportion is 50% by mass or less, a necessary amount of the component (a) may be secured. When the present crosslinked polymer includes the component (b), the proportion of the component (a) is, for example, 50% by mass or more and 99% by mass or less, or for example 60% by mass or more and 95% by mass or less, or for example 70% by mass or more and 90% by mass or less relative to all structural units in the crosslinked polymer.

Alternatively, the nonionic ethylenically unsaturated monomer used may be, for example, a (meth)acrylic acid ester. Examples of the (meth)acrylic acid ester include (meth)acrylic acid alkyl ester compounds such as methyl (meth)acrylate, ethyl (meth)acrylate, butyl (meth)acrylate, isobutyl (meth)acrylate and 2-ethylhexyl (meth)acrylate;
(meth)acrylic acid cycloalkyl ester compounds such as cyclohexyl (meth)acrylate and methylcyclohexyl (meth) acrylate;
(meth)acrylic acid alkoxyalkyl ester compounds such as 2-methoxyethyl (meth)acrylate and ethoxyethyl (meth) acrylate; and (meth)acrylic acid hydroxyalkyl ester compounds such as hydroxyethyl (meth)acrylate, hydroxypropyl (meth)acrylate and hydroxybutyl (meth)acrylate. The compounds may be used alone or two or more thereof may be used in combination.

When the nonionic ethylenically unsaturated monomer used is a (meth)acrylic acid ester, the proportion of the structural unit derived from the (meth)acrylic acid ester is, for example, 1% by mass or more and 30% by mass or less, or for example 5% by mass or more and 30% by mass or less, or for example 10% by mass or more and 30% by mass or less relative to all structural units in the present crosslinked polymer. In this case, the proportion of the component (a) is, for example, 70% by mass or more and 99% by mass or less, or for example 70% by mass or more and 95% by mass or less, or for example 70% by mass or more and 90% by mass or less relative to all structural units in the present crosslinked polymer.

Among them, since lithium ion conductivity is high and high-rate performance are more improved, a compound having an ether bond such as alkoxyalkyl (meth)acrylates including 2-methoxyethyl (meth)acrylate and ethoxyethyl (meth)acrylate is preferable and 2-methoxyethyl (meth) acrylate is more preferable.

Among the nonionic ethylenically unsaturated monomers, a compound having an acryloyl group is preferable because of high polymerization rate, resulting in a polymer having long primary chain length and a binder having preferable binding strength. The nonionic ethylenically unsaturated monomer is preferably a compound having a glass transition temperature (Tg) of a homopolymer of 0° C. or lower because the electrode obtained has preferable flexing endurance.

The present crosslinked polymer may be a salt. The type of the salt is not particularly limited and examples thereof include salts of alkali metals such as a lithium salt, a sodium salt and a potassium salt; alkaline earth metal salts such as a calcium salt and a barium salt; other metal salts such as a magnesium salt and an aluminum salt; ammonium salts and organic amine salts. Among others, alkali metal salts and a magnesium salt is preferable and alkali metal salts are more preferable because adverse effects on battery properties may hardly occur. Particularly preferable alkali metal salts are a lithium salt and a sodium salt. A lithium salt is preferable in view of battery properties at low temperatures.

(Modes of the Crosslinked Polymer)

The modes of crosslinking in the present crosslinked polymer are not particularly limited, and examples thereof include modes according to the methods indicated below.
1) Copolymerization of crosslinkable monomers;
2) Utilizing chain transfer to polymer chains during radial polymerization; and
3) Synthesizing a polymer having a reactive functional group followed by optional addition of a crosslinking agent and post crosslinking.

Among others, the method by copolymerization of crosslinkable monomers is preferable because the procedures are easy and the degree of crosslinking may be easily regulated.

(Crosslinkable Monomer)

Examples of the crosslinkable monomer include a polyfunctional polymerizable monomer having two or more polymerizable unsaturated groups and a monomer having an crosslinkable functional group that is autocrosslinkable such as a hydrolyzable silyl group.

The polyfunctional polymerizable monomer is a compound having two or more polymerizable functional groups such as a (meth)acryloyl group and an alkenyl group in a molecule, and examples thereof include polyfunctional (meth)acrylate compounds, polyfunctional alkenyl compounds and compounds having both (meth)acryloyl group and alkenyl group. The compounds may be used alone or two or more thereof may be used in combination. Among others, a polyfunctional alkenyl compound is preferable and a polyfunctional allyl ether compound having more than one allyl ether group in a molecule is particularly preferable because homogeneous crosslinking structure may be easily obtained.

Examples of the polyfunctional (meth)acrylate compound include di(meth)acrylates of dihydric alcohols such as ethylene glycol di(meth)acrylate, propylene glycol di(meth)acrylate, 1,6-hexanediol di(meth)acrylate, polyethylene glycol di(meth)acrylate and polypropylene glycol di(meth)acrylate; poly(meth)acrylates such as tri(meth)acrylates and tetra(meth)acrylates of tri- or higher poly-hydric alcohols such as trimethylolpropane tri(meth)acrylate, tri(meth)acrylate of ethylene oxide-modified trimethylolpropane, glyceryl tri(meth)acrylate, pentaerythritol tri(meth)acrylate and pentaerythritol tetra(meth)acrylate; bisamides such as methylenebisacrylamide and hydroxyethylenebisacrylamide.

Examples of the polyfunctional alkenyl compound include polyfunctional allyl ether compounds such as trimethylolpropane diallyl ether, trimethylolpropane triallyl ether, pentaerythritol diallyl ether, pentaerythritol triallyl ether, tetraallyloxyethane and polyallyl saccharose; polyfunctional allyl compounds such as diallyl phthalate; and polyfunctional vinyl compounds such as divinylbenzene.

Examples of the compound having both (meth)acryloyl group and alkenyl group include allyl (meth)acrylate, isopropenyl (meth)acrylate, butenyl (meth)acrylate, pentenyl (meth)acrylate and 2-(2-vinyloxyethoxy)ethyl (meth)acrylate.

Specific examples of the monomer having a crosslinkable functional group that is autocrosslinkable include hydrolyzable silyl group-containing vinyl monomers, N-methylol (meth)acrylamide and N-methoxyalkyl(meth)acrylates. The compounds may be used alone or two or more thereof may be used in combination.

The hydrolyzable silyl group-containing vinyl monomer is not particularly limited as long as the monomer is a vinyl monomer having at least one hydrolyzable silyl group. Examples thereof include vinylsilanes such as vinyltrimethoxysilane, vinyltriethoxysilane, vinylmethyldimethoxysilane and vinyldimethylmethoxysilane; silyl group-containing acrylic acid esters such as trimethoxysilylpropyl acrylate, triethoxysilylpropyl acrylate and methyldimethoxysilylpropyl acrylate; silyl group-containing methacrylic acid esters such as trimethoxysilylpropyl methacrylate, triethoxysilylpropyl methacrylate, methyldimethoxysilylpropyl methacrylate and dimethylmethoxysilylpropyl methacrylate; silyl group-containing vinyl ethers such as trimethoxysilylpropyl vinyl ether; and silyl group-containing vinyl esters such as vinyl trimethoxysilylundecanoate.

When the present crosslinked polymer is crosslinked by the crosslinkable monomer, the amount of the crosslinkable monomer used may be 0.02% to 0.7% by mole relative to the total amount of monomers (non-crosslinkable monomers) other than the crosslinkable monomer. Alternatively, the amount is, for example, 0.03% to 0.4% by mole. The amount of the crosslinkable monomer used of 0.02% by mole or more is preferable because the binding ability and the stability of a mixture layer slurry is more improved. When the amount is 0.7% by mole or less, the stability of the crosslinked polymer tends to increase.

The amount of the crosslinkable monomer used is, for example, 0.05% to 5% by mass, or for example 0.1% to 4% by mass, or for example 0.2% to 3% by mass, or for example 0.3% to 2% by mass in all compositional monomers in the crosslinked polymer.

When a crosslinked polymer has increased polymer chain length (primary chain length), the toughness thereof is generally enhanced, high binding ability may be provided and the viscosity of an aqueous dispersion thereof increases. A crosslinked polymer (salt) obtained by carrying out a relatively low extent of crosslinking to a polymer having a long primary chain length is present in water as a microgel swollen in water. The composition for an electrode mixture layer of the present disclosure shows an effect of increased viscosity and an effect of stabilization of dispersion due to interaction of the microgel. The interaction of the microgel may vary according to the degree of water swelling of the microgel and the strength of the microgel, which are affected by the degree of crosslinking of the crosslinked polymer. When the degree of crosslinking is too low, the microgel may have insufficient strength, resulting in insufficient effect of stabilization of dispersion or binding ability. Meanwhile, when the degree of crosslinking is too high, the microgel may have an insufficient degree of swelling, resulting in insufficient effect of stabilization of dispersion or binding ability. Namely, it is desirable that the crosslinked polymer is a slightly crosslinked polymer obtained by appropriate crosslinking carried out on a polymer having a sufficiently long primary chain length.

The present crosslinked polymer or a salt thereof can be used in the form of salt in which acid groups such as carboxyl groups derived from the ethylenically unsaturated carboxylic acid monomer are neutralized, thereby providing the degree of neutralization in a mixture layer composition of 20% to 100% by mole. The degree of neutralization is, for example, 50% to 100% by mole, or for example 60% to 95% by mole. The degree of neutralization of 20% by mole or more is preferable because the water swelling is preferable and an effect of stabilization of dispersion may be easily obtained. In the present specification, the degree of neutralization may be calculated from the amounts charged of the monomer having an acid group such as a carboxyl group and a neutralizing agent used for neutralization. The degree of neutralization may be verified from the ratio of the strength between the peak derived from the C=O group of the carboxylic acid and the peak derived from the C=O group of Li carboxylate obtained by subjecting powder of the crosslinked polymer or a salt thereof obtained after drying treatment under reduced pressure at 80° C. for 3 hours to IR analysis.

The crosslinked polymer or a salt thereof may have the degree of neutralization described above, and a 0.5% by mass aqueous solution of the crosslinked polymer or a salt thereof may show a pH of 7.5 or more. If the pH is 7.5 or more, preferable dispersibility, applicability (easiness of application of the binder), adhesiveness, cycle property and the like may be secured, resulting in preparation of an electrode having excellent integrity. The pH is, for example, 7.7 or more, or for example 7.9 or more, or for example 8.0 or more, or for example 8.1 or more, or for example 8.5 or more. The upper limit is not particularly limited and may be, for example, 10.0 or less, or for example 9.0 or less.

The pH of the 0.5% by mass aqueous solution may be adjusted according to the degree of neutralization of the present crosslinked polymer, and when the degree of neutralization is high, the pH shifts to the alkaline side.

The total amount (hereinafter also referred to as residual carboxylic acid monomer (salt) content) of the ethylenically unsaturated carboxylic acid monomer and a salt thereof in terms of a non-neutralized form which is converted from the ethylenically unsaturated carboxylic acid monomer and a salt thereof (namely, all ethylenically unsaturated carboxylic acid monomers present are converted into the carboxylic acid form) relative to the total amount of the present crosslinked polymer and a salt thereof may be, for example, 5.0% by mass or less. The residual carboxylic acid monomer (salt) content may be, for example 4.0% by mass or less, or for example 3.0% by mass or less, or for example 2.0% by mass or less, or for example 1.5% by mass or less, or for example 1.0% by mass or less, or for example 0.5% by mass or less. When the residual carboxylic acid monomer (salt) content is 5.0% by mass or less, high binding ability may be obtained.

When the content is 3.0% by mass or less, the binding ability is improved and the adhesiveness and cycle property is improved by approximately 1.7 times compared to the case where the residual carboxylic acid monomer (salt) content exceeds 5.0% by mass. For example, in the evaluation method in Examples, the peeling strength exhibited may be 550 mN/25 mm or more and, similarly, the 100-cycle capacity maintenance rate exhibited may be, for example, 66% or more. When the content is 2.0% by mass or less, further higher binding ability may be obtained. Namely, the binding ability may be improved compared to the case where the residual carboxylic acid monomer (salt) content exceeds 5.0% by mass, and, for example, in the evaluation method in Examples, the peeling strength exhibited may be 600 mN/25 mm or more and, similarly, the 100-cycle capacity maintenance rate exhibited may be, for example, 75% or more. When the content is 1.0% by mass or less, further higher binding ability may be obtained. Namely, the binding ability may be improved compared to the case where the residual carboxylic acid monomer (salt) content exceeds 5.0% by mass, and, for example, in the evaluation method in Examples, the peeling strength exhibited may be 700 mN/25 mm or more, or for example 750 mN/25 mm or more and, similarly, the 100-cycle capacity maintenance rate exhibited may be, for example, 85% or more. When the content is 0.5% by mass or less, still further higher binding ability may be obtained. Namely, the binding ability may be improved compared to the case where the residual carboxylic acid monomer (salt) content exceeds 5.0% by mass, and, for example, in the evaluation method in Examples, the peeling strength exhibited may be 770 mN/25 mm or more and, similarly, the 100-cycle capacity maintenance rate exhibited, for example, may be 90% or more.

The lower limit of the residual carboxylic acid monomer (salt) content is not particularly limited and may be, for example, 0.05% by mass or more. The lower limit may be, for example, 0.1% by mass or more, or for example 0.2% by mass or more, or for example 0.3% by mass or more, or for example 0.4% by mass or more. This is because the residual carboxylic acid monomer (salt) content of, for example, less than 0.05% by mass may not be advantageous in view of the cost of washing or the like.

The residual carboxylic acid monomer (salt) content is a proportion based on the total amount of the present crosslinked polymer and a salt thereof. The "total amount of the present crosslinked polymer and a salt thereof" as used herein is a total amount of the present crosslinked polymer or a salt thereof as "resin powder" and includes the residual ethylenically unsaturated carboxylic acid monomer and a salt thereof. The "resin powder" is powder (resin solid matters) obtained by, for example, synthesis of the crosslinked polymer or a salt thereof and optionally drying the same. The "residual carboxylic acid monomer (salt) content" is the total amount of the ethylenically unsaturated carboxylic acid monomer or a salt thereof present in the "resin powder" as the binder all of which is converted to the non-neutralized acid form. Therefore, the residual carboxylic acid monomer (salt) content may be determined by treating the crosslinked polymer or a salt thereof (resin solid matters of the present crosslinked polymer or a salt thereof in the form of powder or the like recovered from a polymerization reaction solution and obtained through, for example, a drying treatment under reduced pressure at 80° C. for 3 hours) obtained from polymerization with water and 1-propanol followed by centrifugation, treating the supernatant obtained with an ion-exchange resin to convert all residual ethylenically unsaturated carboxylic acid monomer into the non-neutralized acid form and subjecting the treatment liquid as a sample to gas chromatography, thereby obtaining the amount of the ethylenically unsaturated carboxylic acid monomer. The residual carboxylic acid monomer (salt) content in the present crosslinked polymer (salt) may be adjusted by, for example, a manner described in the method for producing the present crosslinked polymer or a salt thereof described hereinbelow.

(Method for Producing the Present Crosslinked Polymer or a Salt Thereof)

For the present crosslinked polymer, well-known polymerization methods such as solution polymerization, precipitation polymerization, suspension polymerization and inverse emulsion polymerization may be used, and precipitation polymerization and suspension polymerization (inverse suspension polymerization) are preferable because of productivity. Precipitation polymerization is more preferable because more preferable properties such as binding ability may be obtained. Precipitation polymerization is a method for producing a polymer by carrying out polymerization reaction in a solvent that dissolves raw material unsaturated monomers, while not substantially dissolving the polymer produced. With the progress of polymerization, polymer particles grow by aggregation, resulting in a dispersion of polymer particles of a few μm to several tens of μm which are secondary aggregated primary polymers of several tens of nm to several hundreds of nm.

Secondary aggregation may be suppressed by selecting a dispersion stabilizer, a polymerization solvent and the like. Precipitation polymerization in which secondary aggregation is suppressed is generally referred to as dispersion polymerization.

In precipitation polymerization, the polymerization solvent used may be selected from water and various organic solvents by taking the type of monomers used into account. In order to obtain a polymer having a longer primary chain length, a solvent having a small chain transfer constant is preferably used.

Specific examples of the polymerization solvent include water-soluble solvents such as methanol, t-butyl alcohol, acetone, acetonitrile and tetrahydrofuran, and benzene, ethyl acetate, dichloroethane, n-hexane, cyclohexane and n-heptane, any one of which may be used alone or two or more thereof may be used in combination. Alternatively, the solvent(s) may be used as a mixed solvent with water. The water-soluble solvent as used herein refers to a solvent having a solubility in water at 20° C. of 10 g/100 ml or more.

Among others, acetonitrile is preferable because generation of coarse particles and adhesion to a reactor is low and polymerization stability is preferable, polymer fine particles deposited are hardly secondarily aggregated (or even if secondary aggregation occurs, aggregates are easily disaggregated in a water medium), a polymer obtained has a small chain transfer constant and a high degree of polymerization (primary chain length) and the procedure of the step neutralization described hereinbelow is easy.

In order to proceed neutralization reaction stably and rapidly in the step neutralization, it is preferable that a small amount of a highly polar solvent is added in the polymerization solvent. Examples of the highly polar solvent preferably include water and methanol. The amount of the highly polar solvent used is, for example, 0.05% to 10.0% by mass, or for example 0.1% to 5.0% by mass, or for example 0.1% to 1.0% by mass based on the total mass of the medium. When the proportion of the highly polar solvent is 0.05% by mass or more, an effect on neutralization reaction is observed and when the proportion is 10.0% by mass or less, an adverse effect on polymerization reaction is not observed. In polymerization of an ethylenically unsaturated carboxylic acid monomer with high hydrophilicity such as acrylic acid, addition of a highly polar solvent improves the polymerization rate and facilitates production of a polymer having a long primary chain length. Among highly polar solvents, water is preferable because water has a high effect of improving the polymerization rate.

The production method of the present disclosure may include a polymerization step of precipitation polymerization of monomer components that contain, for example, 50% by mass or more and 100% by mass or less of ethylenically unsaturated carboxylic acid monomer. According to the polymerization step, the crosslinked polymer contains 50% by mass or more and 100% by mass or less of structural units (component (a)) derived from the ethylenically unsaturated carboxylic acid monomer introduced therein. The amount of the ethylenically unsaturated carboxylic acid monomer used is, for example, 60% by mass or more and 100% by mass or less, or for example 70% by mass or more and 100% by mass or less.

The ethylenically unsaturated carboxylic acid monomer may be non-neutralized or may be in the form of neutralized salt. The ethylenically unsaturated carboxylic acid monomer used may be in the form of partially neutralized salt. Because polymerization rate is high and thus a polymer obtained has high molecular weight and excellent binding ability, the ethylenically unsaturated carboxylic acid monomer may have a degree of neutralization of, for example, 10% by mole or less, or for example 5% by mole or less and the monomer may be, for example, non-neutralized.

In the production method of the present disclosure, in addition to the ethylenically unsaturated carboxylic acid monomer, additional ethylenically unsaturated monomer capable of copolymerizing with the above monomer may be included as a monomer component. Examples of the additional ethylenically unsaturated monomer include ethylenically unsaturated monomer compounds having anionic groups other than carboxyl group such as sulfonate group and phosphate group, and nonionic ethylenically unsaturated monomers. Among others, a structural unit derived from a nonionic ethylenically unsaturated monomer is preferable because of the flexing endurance. The nonionic ethylenically unsaturated monomer may be included at, for example, 1% by mass or more and 50% by mass or less, or for example 5% by mass or more and 40% by mass or less, or for example 10% by mass or more and 30% by mass or less relative to the total amount of monomer components. The upper limit of the component (b) may be 49.95% by mass or less or 49.9% by mass or less.

When the crosslinked polymer contains 1% by mass or more component (b), the nonionic ethylenically unsaturated monomer used which provides a mixture layer having a higher flexibility may be the monomers described above as monomers that form the component (b). Among others, (meth)acrylamide and a derivative thereof are preferable because the binding ability of the binder is excellent. The nonionic ethylenically unsaturated monomer used may alternatively be, for example, a (meth)acrylic acid ester. When a (meth)acrylic acid ester is used, the amount of the (meth)acrylic acid ester used is, for example, 1% by mass or more and 30% by mass or less, for example, 5% by mass or more and 30% by mass or less, for example, 10% by mass or more and 30% by mass or less relative to the total amount of monomer components.

The polymerization initiator used may be a well-known polymerization initiator such as an azo compound, an organic peroxide and an inorganic peroxide without particular limitation. The use conditions may be adjusted within well-known methods such as thermal initiation, redox initiation using a reducing agent in combination and UV initiation so as to provide an appropriate amount of radical generation. In order to obtain a crosslinked polymer having long primary chain length, the conditions are preferably adjusted to reduce the amount of radical generation as much as possible within the allowable production time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), any one of which may be used alone or two or more thereof may be used.

Examples of the organic peroxide include 2,2-bis(4,4-di-t-butylperoxycyclohexyl)propane (manufactured by NOF Corporation; the same applies hereinafter in this paragraph, product name "PERTETRA A"), 1,1-di(t-hexylperoxy)cyclohexane (product name "PERHEXA HC"), 1,1-di(t-butylperoxy)cyclohexane (product name "PERHEXA C"), n-butyl-4,4-di(t-butylperoxy)valerate (product name "PERHEXA V"), 2,2-di(t-butylperoxy)butane (product name "PERHEXA 22"), t-butyl hydroperoxide (product name "PERBUTYL H"), cumene hydroperoxide (manufactured by NOF Corporation, product name "PERCUMYL H"), 1,1,3,3-tetramethylbutyl hydroperoxide (product name "PEROCTA H"), t-butyl cumyl peroxide (product name "PERBUTYL C"), di-t-butyl peroxide (product name "PERBUTYL D"), di-t-hexyl peroxide (product name "PERHEXYL D"), di(3,5,5-trimethylhexanoyl)peroxide (product name "PEROYL 355"), dilauroyl peroxide (product name "PEROYL L"), bis(4-t-butylcyclohexyl)peroxydicarbonate (product name "PEROYL TCP"), di-2-ethylhexylperoxydicarbonate (product name "PEROYL OPP"), di-sec-butylperoxydicarbonate (product name "PEROYL SBP"), cumylperoxyneodecanoate (product name "PERCUMYL ND"), 1,1,3,3-tetramethylbutylperoxyneodecanoate (product name "PEROCTA ND"), t-hexylperoxyneodecanoate (product name "PERHEXYL ND"), t-butylperoxyneodecanoate (product name "PERBUTYL ND"), t-butylperoxyneoheptanoate (product name "PERBUTYL NHP"), t-hexylperoxypivalate (product name "PERHEXYL PV"), t-butylperoxypivalate (product name "PERBUTYL PV"), 2,5-dimethyl-2,5-di(2-ethylhexanoyl)hexane (product name "PERHEXA 250"), 1,1,3,3-tetramethylbutylperoxy-2-ethylhexanoate (product name "PEROCTA O"), t-hexylperoxy-2-ethylhexanoate (product name "PERHEXYL O"), t-butylperoxy-2-ethylhexanoate (product name "PERBUTYL O"), t-butylperoxylaurate (product name "PERBUTYL L"), t-butylperoxy-3,5,5-trimethylhexanoate (product name "PERBUTYL 355"), t-hexylperoxyisopropylmonocarbonate (product name "PERHEXYL I"), t-butylperoxyisopropylmonocarbonate (product name "PERBUTYL I"), t-butylperoxy-2-ethylhexylmonocarbonate (product name "PERBUTYL E"), t-butylperoxyacetate (product name "PERBUTYL A"), t-hexylperoxybenzoate (product name "PERHEXYL Z")

and t-butylperoxybenzoate (product name "PERBUTYL Z"), any one of which may be used alone or two or more thereof may be used.

Examples of the inorganic peroxide include potassium persulfate, sodium persulfate and ammonium persulfate. For redox initiation, the reducing agent used may be sodium sulfite, sodium thiosulfate, sodium formaldehyde sulfoxylate, ascorbic acid, sulfurous acid gas ($SO_2$) or ferrous sulfate.

The amount of the polymerization initiator used is, for example, 0.001 to 2 parts by mass, for example, 0.005 to 1 part by mass, for example, 0.01 to 0.1 parts by mass when the sum of the monomer components used is regarded as 100 parts by mass. When the amount of the polymerization initiator used is 0.001 parts by mass or more, polymerization reaction may be stably carried out, and when the amount is 2 parts by mass or less, a polymer having a long primary chain length may be easily obtained.

The concentration of the monomer components during polymerization is preferably high in order to obtain a polymer having a longer primary chain length. However, an extremely high monomer component concentration may facilitate aggregation of polymer particles and make the regulation of the heat of polymerization difficult, thereby allowing runaway polymerization reaction. Therefore, the monomer concentration at the start of polymerization is generally in the range of approximately 2% to 30% by mass, for example, in the range of 5% to 30% by mass.

The polymerization temperature is, although it may vary according to the type and concentration of the monomer used, for example, 0° C. to 100° C., or for example 20° C. to 80° C. The polymerization temperature may be constant or may vary during polymerization reaction. The polymerization time is, for example, 1 minute to 20 hours, or for example 1 hour to 10 hours.

The production method of the present disclosure may include a washing step of washing the crosslinked polymer dispersion obtained through the polymerization reaction. By the washing step, unreacted monomer (and a salt thereof) in the polymerization step may be eliminated. The washing step is carried out by, after the polymerization step followed by a solid-liquid separation step such as centrifugation or filtration, washing the cake component obtained by the solid-liquid separation step with an organic solvent or a mixed solvent of an organic solvent and water. When the washing step is included, secondary aggregates of the crosslinked polymer, if being formed, may be easily disaggregated easily at the time of use, and because the residual unreacted monomer is eliminated, preferable binding ability and battery properties are exhibited. The washing step may be carried out once or more than once. The number of washing steps is not particularly limited and may be, for example, one. The number of washing steps is, for example, 2 or more, or for example 3 or more, or for example 4 or more, or for example 5 or more, or for example 6 or more, or for example 7 or more.

The washing solvent used in the washing step may be a solvent used as a polymerization solvent. Specific washing solvents include water-soluble solvents such as methanol, t-butyl alcohol, acetone, acetonitrile and tetrahydrofuran, and benzene, ethyl acetate, dichloroethane, n-hexane, cyclohexane and n-heptane, which may be used alone or two or more thereof may be used in combination. Alternatively, the solvent(s) may be used as a mixed solvent with water. Among others, an alcoholic solvent such as methanol and acetonitrile may be suitably used because of elimination efficiency of the unreacted monomer (and a salt thereof).

The amount of the washing solvent used is not particularly limited. The mass ratio of the washing solvent that may be used relative to the crosslinked polymer is 0.1 times or more and 20 times or less, or 0.2 times or more and 15 times or less, or 0.3 times or more and 10 times or less.

The total amount of the unreacted monomer and a salt thereof relative to the total amount of the crosslinked polymer and a salt thereof obtained may be regulated by appropriately adjusting the number of washing steps. By adjusting the number of washing steps, the residual carboxylic acid monomer (salt) content which is the total amount of the unreacted ethylenically unsaturated carboxylic acid monomer and a salt thereof converted into the non-neutralized form relative to the total amount of the crosslinked polymer and a salt thereof may be, for example, 5.0% by mass or less, or for example 4.0% by mass or less, or for example 3.0% by mass or less, or for example 2.0% by mass or less, or for example 1.5% by mass or less, or for example 1.0% by mass or less, or for example 0.5% by mass or less. By configuring the amount to be 5.0% by mass or less, excellent binding ability may be secured. In the washing step, by decreasing the residual carboxylic acid monomer (salt) content as described above, more excellent binding ability may be obtained. Therefore, it is preferable to adjust the number of washing steps so as to decrease the residual carboxylic acid monomer (salt) content.

After the washing step, a solvent may be eliminated by reduced pressure and/or heat treatment in the drying step, thereby providing the desired crosslinked polymer in the form of powder.

In the production method of the present disclosure, when the ethylenically unsaturated carboxylic acid monomer used is a non-neutralized or partially neutralized salt, an alkali compound may be added to the polymer dispersion obtained after the polymerization step to neutralize the polymer (hereinafter referred to as "step neutralization") followed by the washing step and the drying step. Alternatively, the crosslinked polymer powder which is non-neutralized or partially neutralized salt may be obtained followed by addition of an alkali compound at the time of preparing an electrode mixture layer slurry to neutralize the polymer (hereinafter referred to as "post neutralization"). Among others, the step neutralization is preferable because secondary aggregates tend to be disaggregated.

(Composition for a Non-Aqueous Electrolyte Secondary Battery Electrode Mixture Layer)

The composition for a non-aqueous electrolyte secondary battery electrode mixture layer (hereinafter also referred to as the present composition) of the present disclosure contains a binder containing the crosslinked polymer or a salt thereof, an active material and water.

The amount of the crosslinked polymer or a salt thereof used in the present composition is, for example, 0.1% by mass or more and 20% by mass or less relative to the total amount of the active material. The amount is, for example, 0.2% by mass or more and 10% by mass or less, or for example 0.3% by mass or more and 8% by mass or less, or for example 0.4% by mass or more and 5% by mass or less. When the amount of the crosslinked polymer and a salt thereof used is less than 0.1% by mass, sufficient binding ability may not be obtained. The dispersion stability of an active material may also be insufficient and the homogeneity of the mixture layer formed may decrease. Meanwhile, when the amount of the crosslinked polymer and a salt thereof used exceeds 20% by mass, the electrode mixture layer composition may have high viscosity to decrease applicability thereof on a current collector. As a result, the mixture layer obtained may have spots and unevenness to adversely affect the electrode properties. Moreover, the interfacial resistance may increase and the rate performance may be worsened.

When the amount of the crosslinked polymer and a salt thereof used is within the above range, the composition obtained has excellent dispersion stability and the mixture layer obtained may have extremely high adhesiveness to a current collector, resulting in improved durability of the battery. The crosslinked polymer and a salt thereof exhibit sufficiently high binding ability with an active material even at a small amount (such as 5% by mass or less) and also have a carboxy anion, thereby providing an electrode having low interfacial resistance and excellent high-rate performance.

Among the active materials described above, the positive electrode active material mainly used is a lithium salt of a transition metal oxide, and layered rock salt type and spinel type lithium-containing metal oxides, for example, may be used. Specific compounds of the layered rock salt type positive electrode active material include lithium cobalt oxide, lithium nickel oxide and so-called ternary compounds such as NCM {$Li(Ni_x,Co_y,Mn_z)$, $x+y+z=1$} and NCA {$Li(Ni_{1-a-b}Co_aAl_b)$}. Examples of the spinel type positive electrode active material include lithium manganese oxide. Other than oxides, phosphate salts, silicate salts and sulfur may be used, and examples of the phosphate salt include olivine type lithium iron phosphate. The positive electrode active materials above may be used alone or two or more thereof may be used in combination as a mixture or a composite.

When the positive electrode active material containing a layered rock salt type lithium-containing metal oxide is dispersed in water, lithium ions on the active material surface and hydrogen ions in water are exchanged, and thus the dispersion is alkaline. Therefore, an aluminum (Al) foil or the like which is a common positive electrode current collector material may be corroded. In such case, it is preferable to neutralize alkaline components eluted from the active material by using, as a binder, the non-neutralized or partially neutralized crosslinked polymer. The amount of the non-neutralized or partially neutralized crosslinked polymer used is preferably such that the amount of non-neutralized carboxyl groups in the crosslinked polymer is equivalent to or above the amount of alkali eluted from the active material.

The positive electrode active material has low electric conductivity, and thus it is common that a conductivity auxiliary agent is added thereto upon use. Examples of the conductivity auxiliary agent include carbon materials such as carbon black, carbon nanotubes, carbon fibers, graphite fine powder and carbon fibers, among which carbon black, carbon nanotubes and carbon fibers are preferable because excellent conductivity may be easily obtained. The carbon black is preferably ketjen black and acetylene black. The conductivity auxiliary agents described above may be used alone or two or more thereof may be used in combination.

The amount of the conductivity auxiliary agent is, for example, 2% by mass or more and 20% by mass or less, or for example 0.2% by mass or more and 10% by mass or less relative to the total amount of the active material in order to achieve both conductivity and energy density.

The positive electrode active material used may be surface-coated with a conductive carbon material.

Meanwhile, examples of the negative electrode active material include carbon materials, metallic lithium, lithium alloys and metal oxides, any one of which may be used alone or two or more thereof may be used in combination. Among others, an active material made of a carbon material (hereinafter also referred to as "carbon active material") such as natural graphite, artificial graphite, hard carbon and soft carbon is preferable and graphite such as natural graphite and artificial graphite and hard carbon are more preferable. In case of graphite, spherical graphite is suitably used because of battery properties, and the particle size thereof is in the range of, for example, 1 to 20 µm, or for example, 5 to 15 µm. In order to increase energy density, the negative electrode active material used may be a metal or oxide of a metal that may occlude lithium such as silicon and tin. Among others, silicon has a higher capacity than graphite and thus an active material made of a silicon material (hereinafter also referred to as "silicon active material") such as silicon, silicon alloys and silicon oxides such as silicon monoxide (SiO) may be used. However, the silicon active material has a large volume change associated with charge and discharge despite high capacity. Therefore, it is preferable to use together with the carbon active material. In this case, when the amount of the silicon active material added is high, the electrode material may collapse and cycle property (durability) may be significantly decreased. Because of this, when the silicon active material is used together, the amount thereof is, for example, 60% by mass or less or for example, 30% by mass relative to the carbon active material.

The carbon active material has preferable conductivity per se, and thus addition of a conductivity auxiliary agent is not always required. When a conductivity auxiliary agent is added for the purpose of further decreasing the resistance or the like, the amount thereof is, for example, 10% by mass or less or for example, 5% by mass or less relative to the total amount of the active material because of energy density.

When the present composition is slurry, the amount of the active material used is, for example, in the range of 10% by mass or more and 75% by mass or less, or for example, in the range of 30% by mass or more and 65% by mass or less relative to the total amount of the composition. When the amount of the active material used is 10% by mass or more, migration of the binder or the like may be inhibited and the cost for drying the medium may enjoy an advantage. Meanwhile, when the amount is 75% by mass or less, the fluidity and applicability of the composition may be secured and a homogeneous mixture layer may be formed.

When the composition for an electrode mixture layer prepared is wet powder, the amount of the active material used is, for example, in the range of 60% by mass or more and 97% by mass or less, or for example, in the range of 70% by mass or more and 90% by mass or less relative to the total amount of the composition. It is preferable that nonvolatile components other than the active material such as the binder and the conductivity auxiliary agent are as low as possible within the range that can secure required binding ability and conductivity because of energy density.

The present composition contains water as a medium. For the purpose of adjusting properties and drying property of the composition, the medium may be a mixed solvent with a water-soluble organic solvent such as lower alcohols including methanol and ethanol, carbonates including ethylene carbonate, ketones including acetone, tetrahydrofuran and N-methylpyrrolidone. The proportion of water in the mixed medium is, for example, 50% by mass or more or for example, 70% by mass or more.

When the present composition is slurry that may be applied, the content of the medium including water in the whole composition is, for example, in the range of 25 to 90% by mass, or for example, in the range of 35 to 70% by mass because of applicability of the slurry, an energy cost required for drying, and productivity. When the composition is wet powder that may be pressed, the content of the medium is, for example, in the range of 3 to 40% by mass, or for example, in the range of 10 to 30% by mass because of the homogeneity of the mixture layer after pressing.

The present binder may contain only the crosslinked polymer or a salt thereof. However, in addition to this, an additional binder component such as styrene/butadiene latex (SBR), acrylic latex and polyvinylidene fluoride latex may be used in combination. When an additional binder component is used in combination, the amount thereof may be, for example, 0.1% by mass or more and 5% by mass or less, or for example 0.1% by mass or more and 2% by mass or less, or for example 0.1% by mass or more and 1% by mass or less relative to the active material. When the amount of the additional binder component used exceeds 5% by mass, the resistance increases and the high-rate performance may be insufficient.

Among others, styrene/butadiene latex is preferable because of excellent balance between binding ability and flexing endurance.

The styrene/butadiene latex refers to a water-based dispersion of a copolymer having a structural unit derived from an aromatic vinyl monomer such as styrene and a structural unit derived from an aliphatic conjugated diene monomer such as 1,3-butadiene. Examples of the aromatic vinyl monomer include, in addition to styrene, α-methylstyrene, vinyltoluene and divinylbenzene, one or two or more of which may be used. The structural unit derived from the aromatic vinyl monomer in the copolymer is, for example, in the range of 20% by mass or more and 60% by mass or less, or for example, in the range of 30% by mass or more and 50% by mass or less mainly because of binding ability.

Examples of the aliphatic conjugated diene monomer include, in addition to 1,3-butadiene, 2-methyl-1,3-butadiene, 2,3-dimethyl-1,3-butadiene and 2-chloro-1,3-butadiene, one or two or more of which may be used.

The structural unit derived from the aliphatic conjugated diene monomer in the copolymer is, for example, in the range of 30% by mass or more and 70% by mass or less, or for example, in the range of 40% by mass or more and 60% by mass or less because the binder and the electrode obtained have preferable binding ability and plasticity, respectively.

The styrene/butadiene latex may contain, in addition to the above monomers, an additional monomer which is a copolymerization monomer such as a nitrile group-containing monomer such as (meth)acrylonitrile and a carboxyl group-containing monomer such as (meth)acrylic acid, itanconic acid and maleic acid in order to further improving properties such as binding ability.

The structural unit derived from the additional monomer in the copolymer may be, for example, in the range of 0% by mass or more and 30% by mass or less, or for example, in the range of 0% by mass or more and 20% by mass or less.

The present composition contains the active material, water and the binder as requisite components and may be obtained by mixing the components using a well-known means. The method for mixing the components is not particularly limited and may be a well-known method. A preferable method includes dry-blending powder components such as the active material, the conductivity auxiliary agent and crosslinked polymer particles corresponding to the binder followed by mixing with a dispersion medium such as water and mixing and kneading for dispersion. When the present composition is obtained in a form of slurry, it is preferable that the finished slurry does not have dispersion defects or aggregates. The means for mixing may be a well-known mixer such as a planetary mixer, a thin-film spin mixer and a planetary centrifugal mixer. Because the preferable dispersive state may be obtained in a short time, a thin-film spin mixer is preferably used. When the thin-film spin mixer is used, preliminary dispersion may be preferably carried out with a stirrer such as a disper.

The viscosity of the slurry is, for example, in the range of 500 to 100,000 mPa·s, or for example, in the range of 1,000 to 50,000 mPa·s as the B type viscosity at 60 rpm.

Meanwhile, when the present composition is obtained in a form or wet powder, it is preferable to mix/knead using a Henschel mixer, a blender, a planetary mixer or a biaxial kneader up to homogeneous powder without concentration unevenness.

(Electrode for a Non-Aqueous Electrolyte Secondary Battery)

The electrode for a non-aqueous electrolyte secondary battery of the present disclosure (hereinafter also referred to as the present electrode) contains a mixture layer formed from the composition for an electrode mixture layer on the surface of a current collector of copper, aluminum or the like. The mixture layer is formed by applying the present composition on the surface of the current collector followed by elimination of a medium such as water by drying. A method for applying the mixture layer composition is not particularly limited, and a well-known method such as the doctor blade method, dipping, roll coating, comma coating, curtain coating, gravure coating and extrusion may be used. Drying may be carried out according to a well-known method such as hot air blowing, reduced pressure, (far) infrared radiation and microwave radiation.

The mixture layer obtained after drying is generally subjected to compression treatment by mold pressing, roll pressing or the like. By compression, the active material and the binder may be tightly adhered and the strength of the mixture layer and the adhesiveness to the current collector may be increased. By compression, the thickness of the mixture layer may be adjusted to, for example, approximately 30% to 80% of the thickness before compression, and the thickness of the mixture layer after compression is generally approximately 4 to 200 μm.

By including a separator and a non-aqueous electrolyte solution with the present electrode, a non-aqueous electrolyte secondary battery may be prepared.

The separator is provided between the positive electrode and the negative electrode of the battery and plays a role in preventing short circuit due to contact of both electrodes and securing ion conductivity by holding the electrolyte solution. The separator is preferably a film-shaped insulating microporous film having preferable ion permeability and mechanical strength. Specific materials that may be used include polyolefins such as polyethylene and polypropylene, polytetrafluoroethylene and the like.

The non-aqueous electrolyte solution may be a well-known electrolyte solution generally used for non-aqueous electrolyte secondary batteries. Specific solvents include cyclic carbonates with high dielectric constants and high ability to dissolve electrolytes such as propylene carbonate and ethylene carbonate and linear carbonates with low viscosity such as ethyl methyl carbonate, dimethyl carbonate and diethyl carbonate, which may be used alone or as a mixed solvent. The non-aqueous electrolyte solution used contains a lithium salt such as $LiPF_6$, $LiSbF_6$, $LiBF_4$, $LiClO_4$ and $LiAlO_4$ dissolved in the solvent.

The non-aqueous electrolyte secondary battery may be obtained by placing, in a case or the like, a positive electrode plate and a negative electrode plate which are partitioned by a separator and are spirally wound or stacked.

Embodiments

The present disclosure is specifically described hereinafter on the basis of Embodiments. The present disclosure is not limited by these Embodiments. "Parts" and "%" hereinafter mean parts by mass and % by mass, respectively, unless otherwise stated.

<<Production of Crosslinked Polymer Salts>>

SYNTHESIS EXAMPLE 1

Production of Crosslinked Polymer Salt P-1

For polymerization, a reactor equipped with stirring blades, a thermometer, a reflux condenser and a nitrogen inlet tube was used. To the reactor, 875.6 parts of acetonitrile, 4.40 parts of ion-exchange water, 100 parts of acrylic acid (hereinafter referred to as "AA") and 0.5 parts of pentaerythritol triallyl ether (manufactured by Daiso Co., Ltd., product name "Neoallyl P-30") were charged. After thoroughly replacing the content of the reactor by nitrogen, the inner temperature was raised to 55° C. by heating. After confirming that the inner temperature was stabilized at 55° C., 0.04 parts of V-65 was added as the polymerization initiator and white turbidity was observed in the reaction solution. Thus, this point was regarded as the polymerization initiation point. The polymerization reaction was continued while maintaining the inner temperature at 55° C. by adjusting the outer temperature (temperature of the water bath). At 5 hours after the polymerization initiation point, cooling of the reaction solution was started, and when the inner temperature was decreased to 25° C., 52.5 parts of lithium hydroxide monohydrate (hereinafter referred to as "LiOH·H$_2$O") powder was added. After the addition, stirring was continued at room temperature for 12 hours, and a polymerization reaction solution in the form of slurry containing particles of crosslinked polymer salt P-1 (Li salt, degree of neutralization: 90% by mole) dispersed in a medium was obtained.

The polymer particles were precipitated by centrifugation of the polymer reaction solution obtained, and the supernatant was removed. Thereafter, the precipitate was dispersed again in the same mass of methanol as the polymer reaction solution and then the washing procedure of precipitation of the polymer particles by centrifugation and removal of the supernatant was repeated seven times. The precipitate was recovered, subjected to drying treatment under reduced pressure at 80° C. for 3 hours to remove volatile components to obtain powder of the crosslinked polymer salt P-1. As the crosslinked polymer salt P-1 was hygroscopic, the crosslinked polymer salt P-1 was stored in a sealed water vapor barrier container. When powder of the crosslinked polymer salt P-1 was subjected to IR measurement and the degree of neutralization was determined from the ratio of the strength between the peak derived from the C=O group of the carboxylic acid and the peak derived from the C=O group of Li carboxylate, which was 90% by mole equal to the value calculated from the charged amounts.

The residual acrylic acid monomer (salt) content was measured under the conditions indicated below, which resulted in 0.5% by mass.

<Measurement of Residual Acrylic Acid Monomer (Salt) Content>

In a 50-mL tube with a screw cap, 0.9 g of a crosslinked polymer salt and 44.1 g of ion-exchange water were weighed and thoroughly mixed to prepare a 2% aqueous solution. In another 50-mL tube with a screw cap, 15 g was weighed and 15 g of 1-propanol was further added thereto and thoroughly mixed to prepare a 1% solution.

The 1% solution was centrifuged (4000 rpm×10 minutes), and 4 g of the supernatant after centrifugation, 1 g of propylene glycol monomethyl ether at a concentration of 2% and 1 g of an ion-exchange resin were added to a 9-mL tube with a screw cap and mixed on a mixing rotator for 1 hour. The supernatant was filtered through a 0.45-μm filter and the filtered solution as a sample was subjected to gas chromatography (GC) analysis.

According to the above procedure, the residual acrylic acid monomer (salt) in the crosslinked polymer may be extracted and measured. GC analysis was carried out after converting into the acrylic acid form (non-neutralized form) by ion exchange, and the obtained result was regarded as the residual acrylic acid monomer (salt) content.

<GC Measurement Conditions>

Device: Agilent 7820A-1 (manufactured by Agilent Technologies, Inc.)

Column: HP-INNOWAX 60 m×0.32 mm, df=0.5 μm

Column temperature: 40° C. (maintained for 7 minutes) →260° C. (maintained for 1 minute)

Ramp rate: 10° C./min

SYNTHETIC EXAMPLES 2 TO 9

Production of Crosslinked Polymer Salts P-2 to P-9

The same procedure as in Production Example 1 was carried out except that the charged amounts of starting materials, the neutralized salt type, the degree of neutralization and the number of washing procedures with methanol were as indicated in Table 1, thereby obtaining crosslinked polymer salts P-2 to P-9 in the form of powder. The crosslinked polymer salts were stored in sealed water vapor barrier containers. In Production example 5, 48% NaOH was used instead of LiOH·H$_2$O to obtain the crosslinked polymer Na salt (degree of neutralization: 90% by mole).

TABLE 1

| Cross-linked polymer salts | Monomer | | Number of washings with MeOH | Neutralized salt | | Residual AA monomer (salt) content [wt %] | Remarks |
|---|---|---|---|---|---|---|---|
| | AA | P-30 | | Type | Degree of neutralization | | |
| P-1 | 100 | 0.5 | 7 | Li | 90% | 0.5 | |
| P-2 | 100 | 0.5 | 4 | Li | 90% | 1.1 | pH = 8.5 |
| P-3 | 100 | 0.5 | 4 | Li | 85% | 1.0 | pH = 8.1 |
| P-4 | 100 | 0.5 | 4 | Li | 80% | 0.9 | pH = 7.9 |
| P-5 | 100 | 0.5 | 4 | Na | 90% | 0.9 | |
| P-6 | 100 | 0.5 | 3 | Li | 90% | 1.8 | |
| P-7 | 100 | 0.5 | 2 | Li | 90% | 2.9 | |
| P-8 | 100 | 0.5 | 1 | Li | 90% | 4.2 | |
| P-9 | 100 | 0.5 | 0 | Li | 90% | 5.5 | |

First Embodiment

An electrode was prepared with the crosslinked polymer salt P-1 and evaluated. Specific procedures and evaluation methods are indicated hereinbelow.

<<Preparation of a Negative Electrode Plate>>

SiOx (0.8<x<1.2) of which surface was coated with 10% carbon by CVD was prepared and mixed with graphite at a mass ratio of 5:95 to obtain an active material. The binder used was a mixture of the crosslinked polymer salt P-1, styrene/butadiene latex (SBR) and carboxymethylcellulose (CMC). The active material, P-1, SBR and CMC were mixed at a mass ratio of active material: P-1:SBR: CMC=95.5:1.5:1.5:1.5 (solid contents) with using water as a dilution solvent on T.K. HIVIS MIX manufactured by Primix Corporation to prepare a negative electrode mixture slurry having a solid content of 50%. The negative electrode mixture slurry was applied to each side of a copper foil and dried to form mixture layers. Thereafter, the mixture layers were pressed so that the mixture layer per side had a thickness of 80 μm and a packed density of 1.60 g/cm$^3$.

<Evaluation of Applicability>

After drying, the mixture layer before pressing was visually observed for the appearance thereof and applicability was evaluated on the basis of the following criteria. The results are indicated in Table 2.

A: no appearance defects such as stripe unevenness and spots was observed on the surface.

B: a few appearance defects such as stripe unevenness and spots were observed on the surface.

C: appearance defects such as stripe unevenness and spots were significantly observed on the surface.

<Evaluation of Adhesiveness>

On an acrylic plate of 120 mm×30 mm, a mixture layer surface of the negative electrode plate of the size of 100 mm×25 mm was attached through a double-sided adhesive tape (manufactured by Nichiban Co., Ltd., Nicetack NW-20). On a desk top tester manufactured by Nidec-Shimpo Corporation (FGS-TV and FGP-5), 90° peeling was carried out at a measurement temperature of 25° C. and a peeling speed of 50 mm/min and the peeling strength between the mixture layer and the copper foil was measured, thereby evaluating adhesiveness. The results are indicated in Table 2.

Next, a battery containing the negative electrode plate made from the crosslinked polymer salt P-1 was prepared and evaluated. Specific procedures and evaluation methods are indicated hereinbelow.

<<Preparation of a Positive Electrode Plate>>

In an N-methylpyrrolidone (NMP) solvent, a positive electrode active material which was $LiNi_{0.8}Co_{0.15}Al_{0.05}O_2$, a carbon conductive agent which was acetylene black and polyvinylidene fluoride (PVDF) having an average molecular weight of 1.1 million were mixed at a mass ratio of 95:2.5:2.5 on a mixer to prepare a positive electrode mixture slurry having a solid content of 50%. The prepared slurry was applied on each side of an aluminum foil, dried and pressed so that the mixture layer per side had a thickness of 95 μm and a packed density of 3.60 g/cm$^3$.

<<Preparation of Electrolyte Solution>>

To a mixed solvent of ethylene carbonate (EC) and dimethyl carbonate (DMC) (volume ratio: EC:DMC=1:3), 5 parts by mass of vinylene carbonate (VC) was added and 1 mole/liter of $LiPF_6$ was dissolved therein to prepare a non-aqueous electrolyte.

<<Preparation of a Battery>>

The structure of the battery was as follows: the positive and negative electrodes to each of which a lead terminal was attached were spirally wound while placing a separator (made of polyethylene: film thickness 16 μm, pore rate: 47%) therebetween and pressed to squash the same into a flat shape to obtain an electrode body. The electrode body was placed in a battery outer packaging made of an aluminum laminate, a liquid was poured and sealed to obtain a test battery. The test battery has a designed capacity of 800 mAh. The capacity of the battery was designed on the basis of the charging termination voltage up to 4.2 V.

<Evaluation of Cycle Property>

The battery obtained as above was subjected to 100 repetitive cycles of the following charge/discharge tests at 25° C. and the capacity maintenance rate was evaluated. The results are indicated in Table 2.

Charge Test

The battery was charged at a constant current of 0.3 C (240 mA) up to 4.2 V, and charged at a constant voltage of 4.2 V up to the current of 1/20 C (40 mA).

Discharge Test

The battery was discharged at a constant current of 0.5 C (400 mA) up to 2.75 V.

Idling

The interval between the charge test and the discharge test was 10 minutes.

Second to Ninth Embodiments and First and Second Comparative Embodiments

The same procedure as in the First Embodiment was carried out except that the crosslinked polymer salts used were as indicated in Table 2, thereby obtaining negative electrode plates and batteries of Second to ninth Embodiments and First and Second Comparative Embodiments. The obtained negative electrode plates and batteries were subjected to the same evaluations as in First Embodiment. The results are indicated in Table 2. In the Third Embodiment and Second Comparative Embodiment, lithium acrylate was added to the crosslinked polymer salt P-2 to prepare the crosslinked polymer salt containing the residual acrylic acid monomer (salt) indicated in Table 2 (*1 and *2 in Table 2).

TABLE 2

| | | | | 1st Embodiment | 2nd Embodiment | 3rd Embodiment | 4th Embodiment | 5th Embodiment | 6th Embodiment |
|---|---|---|---|---|---|---|---|---|---|
| Mixture layer slurry composition | Binder | Crosslinked polymer salt | Type | P-1 | P-2 | P-2 | P-3 | P-4 | P-5 |
| | | | [parts] | 1.5 | 1.5 | 1.5 | 1.5 | 1.5 | 1.5 |
| | | SBR | [parts] | 1.5 | 1.5 | 1.5 | 1.5 | 1.5 | 1.5 |
| | | CMC | [parts] | 1.5 | 1.5 | 1.5 | 1.5 | 1.5 | 1.5 |
| | | Residual AA monomer (salt) content | [wt %] | 0.5 | 1.1 | 1.8*[1] | 1.0 | 0.9 | 0.9 |

TABLE 2-continued

| | | | | | | | | | |
|---|---|---|---|---|---|---|---|---|---|
| Slurry property | Applicability | [—] | | A | A | A | B | A | A |
| Electrode plate property | Adhesiveness | [mN/25 mm] | | 790 | 750 | 612 | 755 | 744 | 760 |
| Battery property | 100-cycle capacity maintenance rate | [%] | | 90 | 90 | 81 | 78 | 69 | 89 |

| | | | | 7th Embodiment | 8th Embodiment | 9th Embodiment | 1st Comparative Embodiment | 2nd Comparative Embodiment |
|---|---|---|---|---|---|---|---|---|
| Mixture layer slurry composition | Binder | Crosslinked polymer salt | Type | P-6 | P-7 | P-8 | P-9 | P-2 |
| | | | [parts] | 1.5 | 1.5 | 1.5 | 1.5 | 1.5 |
| | | SBR | [parts] | 1.5 | 1.5 | 1.5 | 1.5 | 1.5 |
| | | CMC | [parts] | 1.5 | 1.5 | 1.5 | 1.5 | 1.5 |
| | | Residual AA monomer (salt) content. | [wt %] | 1.8 | 2.9 | 4.2 | 5.5 | 5.5*2 |
| Slurry property | Applicability | | [—] | A | A | A | A | A |
| Electrode plate property | Adhesiveness | | [mN/25 mm] | 620 | 580 | 520 | 350 | 330 |
| Battery property | 100-cycle capacity maintenance rate | | [%] | 80 | 72 | 69 | 50 | 41 |

As indicated in table 2, First, Second, and Fourth to Ninth Embodiments using crosslinked polymers which contained adjusted total amounts of residual acrylic acid and a salt thereof (obtained after the washing step) secured applicability while exhibiting preferable adhesiveness and battery property. It was also found that when the total amount of the residual carboxylic acid and a salt thereof is reduced, adhesiveness and cycle property could be easily improved (First, Second, and Seventh to Ninth Embodiments) and the increased pH showed increased cycle property. It was also found that using a sodium salt also showed high applicability and adhesiveness.

Meanwhile, it was found that First Comparative Embodiment using the crosslinked polymer that contained the total amount of the residual acrylic acid and a salt thereof without adjustment (without the washing step) had preferable applicability, but it was difficult to improve adhesiveness and cycle property.

It was also found that Third Embodiment, in which lithium acrylate was added to the purified crosslinked polymer salt P-2 so that the amount of the acrylic acid monomer (salt) contained was the same as the residual acrylic acid monomer (salt) in the crosslinked polymer salt used in Seventh Embodiment, showed preferable results on all applicability, adhesiveness and cycle property, while Second Comparative Embodiment, in which lithium acrylate was added to the crosslinked polymer salt P-2 so that the amount of lithium acrylate contained was the same as the residual lithium acrylate in the crosslinked polymer salt used in First Comparative Embodiment, was difficult to have improved adhesiveness and cycle property. The results showed that the residual acrylic acid monomer (salt) content significantly contribute to physical properties and properties.

The above results showed that decreasing the residual acrylic acid monomer (salt) content by increasing the number of washings unexpectedly contributed the binding ability of the binder and had an effect of possible improvement in adhesiveness of the mixture layer and battery properties.

The invention claimed is:

1. A binder for a non-aqueous electrolyte secondary battery electrode comprising:
    a salt of a crosslinked polymer having a carboxyl group, and
    an ethylenically unsaturated carboxylic acid monomer and/or a salt thereof, as a residual monomer,
    wherein
    the salt of the crosslinked polymer comprises a structural unit derived from the ethylenically unsaturated carboxylic acid monomer and/or the salt thereof, in an amount of 50% by mass or more and 100% by mass or less, relative to all structural units of the crosslinked polymer,
    a total amount of a substance of non-neutralized type converted from the ethylenically unsaturated carboxylic acid monomer and/or the salt thereof is more than 0% by mass and 4.2% by mass or less, relative to the salt of the crosslinked polymer, and
    the salt of the crosslinked polymer further comprises a lithium salt.

2. The binder according to claim 1, wherein the salt of the crosslinked polymer further comprises a structural unit derived from a crosslinkable monomer.

3. The binder according to claim 1, wherein a 0.5% by mass aqueous solution of the salt of the crosslinked polymer shows a pH of 7.5 or more.

4. The binder according to claim 2, wherein a 0.5% by mass aqueous solution of the salt of the crosslinked polymer shows a pH of 7.5 or more.

5. The binder according to claim 1, wherein the total amount of the substance of non-neutralized type converted from the ethylenically unsaturated carboxylic acid monomer and/or the salt thereof is more than 0% by mass and 3.0% by mass or less.

6. The binder according to claim 1, wherein a degree of neutralization is 85% or more.

7. The binder according to claim 1, wherein a degree of neutralization is 90% or more.

8. The binder according to claim 1, wherein a 0.5% by mass aqueous solution of the salt of the crosslinked polymer shows a pH of 8.5 or more.

9. The binder according to claim 1, wherein the total amount of the substance of non-neutralized type converted from the ethylenically unsaturated carboxylic acid monomer and/or the salt thereof is from 0.05% by mass to 4.2% by mass.

* * * * *